US008928576B2

(12) United States Patent  (10) Patent No.: US 8,928,576 B2
Yamazaki  (45) Date of Patent: Jan. 6, 2015

(54) ELECTROPHORETIC DISPLAY DEVICE, DRIVING METHOD THEREOF, AND ELECTRONIC APPARATUS

(75) Inventor: Katsunori Yamazaki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 859 days.

(21) Appl. No.: 12/955,057

(22) Filed: Nov. 29, 2010

(65) Prior Publication Data

US 2011/0134156 A1 Jun. 9, 2011

(30) Foreign Application Priority Data

Dec. 4, 2009 (JP) ................. 2009-276411

(51) Int. Cl.
G09G 3/34 (2006.01)
G02F 1/167 (2006.01)
G09G 3/20 (2006.01)

(52) U.S. Cl.
CPC .............. G09G 3/3446 (2013.01); G02F 1/167 (2013.01); G09G 3/207 (2013.01); G02F 2001/1676 (2013.01); G09G 2310/0262 (2013.01); G09G 2380/02 (2013.01)
USPC .......................................... 345/107; 345/690

(58) Field of Classification Search
USPC .......................................... 345/690, 211, 107
See application file for complete search history.

(56) References Cited

U.S. PATENT DOCUMENTS

2003/0231162 A1* 12/2003 Kishi ............................ 345/107
2004/0150325 A1* 8/2004 Yamakita et al. ............. 313/498
2006/0087488 A1* 4/2006 Ito ................................. 345/103
2006/0221049 A1 10/2006 Miyasaka et al.
2006/0279525 A1* 12/2006 Matsuda ....................... 345/107
2007/0200813 A1 8/2007 Liu
2007/0268245 A1 11/2007 Sugita et al.
2008/0238871 A1* 10/2008 Tam ............................. 345/158
2009/0218931 A1* 9/2009 Shimodaira ................... 313/498
2009/0237333 A1* 9/2009 Saito ............................. 345/76
2009/0237393 A1* 9/2009 Saito ............................. 345/214
2010/0002175 A1* 1/2010 Kim et al. ..................... 349/115
2010/0073282 A1* 3/2010 Murayama .................... 345/107
2013/0147519 A1* 6/2013 Koyama et al. ............... 326/102

FOREIGN PATENT DOCUMENTS

| JP | 2003-535355 A | 11/2003 |
| JP | 2004-012829 A | 1/2004 |
| JP | 2005-215092 A | 8/2005 |
| JP | 2006-520012 A | 8/2006 |
| JP | 2006-309131 A | 11/2006 |
| JP | 2007-226177 A | 9/2007 |
| JP | 2007-310182 A | 11/2007 |
| WO | WO-01-07961 A | 2/2001 |
| WO | WO-2004-075151 A | 9/2004 |

* cited by examiner

*Primary Examiner* — Ricardo L Osorio
(74) *Attorney, Agent, or Firm* — ALG Intellectual Property, LLC

(57) ABSTRACT

The electrophoretic display device in which an electrophoretic element is interposed between a pair of substrates includes a first electrode and a second electrode that are formed in each pixel on one substrate, and an opposing electrode that is formed on another substrate, and faces the first electrode and the second electrode through the electrophoretic element. Here, a gradation is displayed due to a difference in potential between the first electrode and the second electrode.

17 Claims, 12 Drawing Sheets

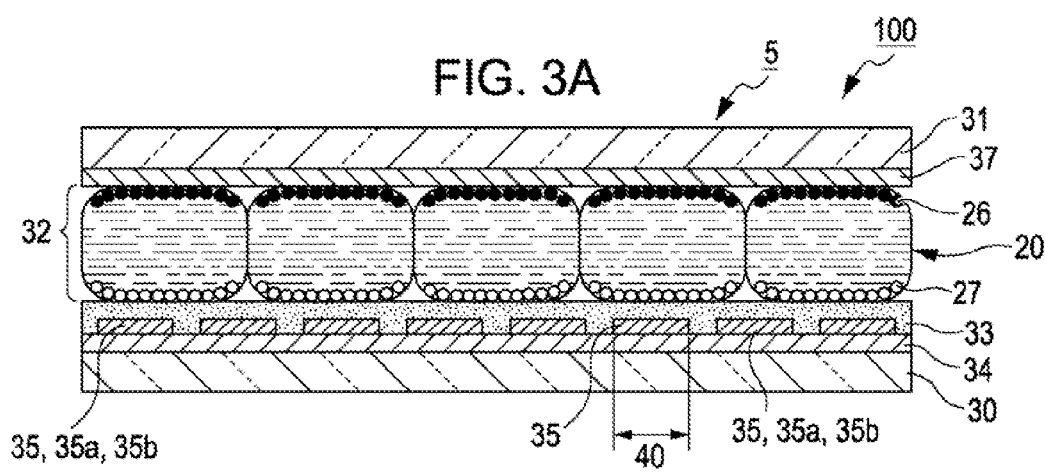
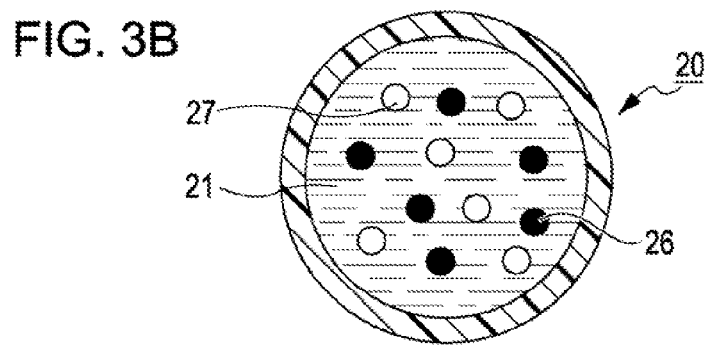
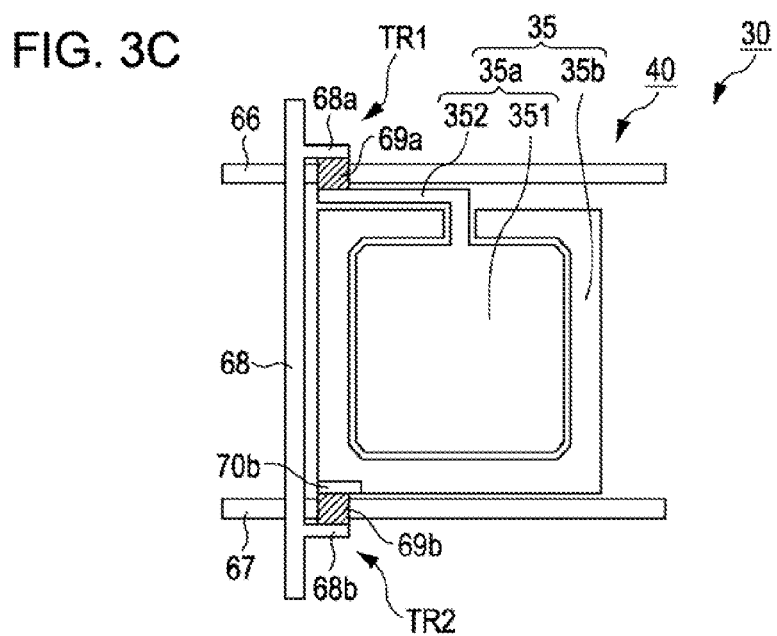

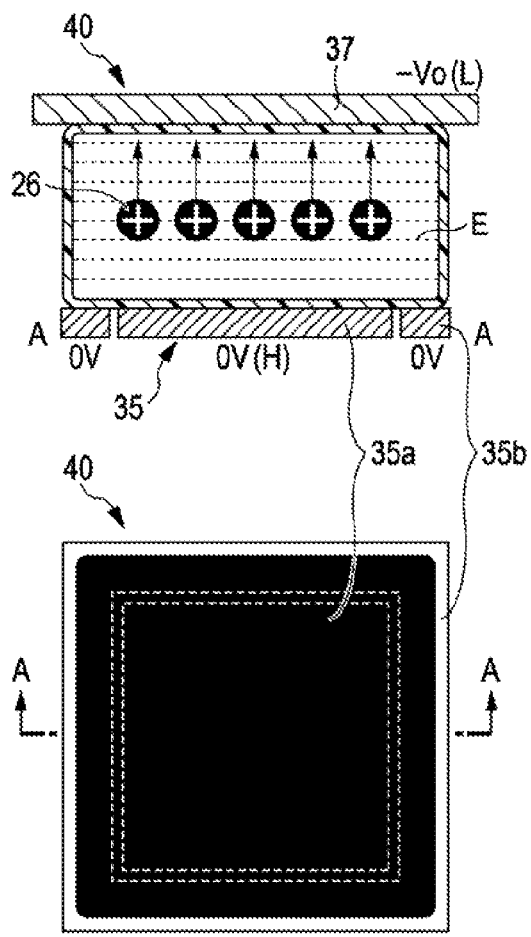
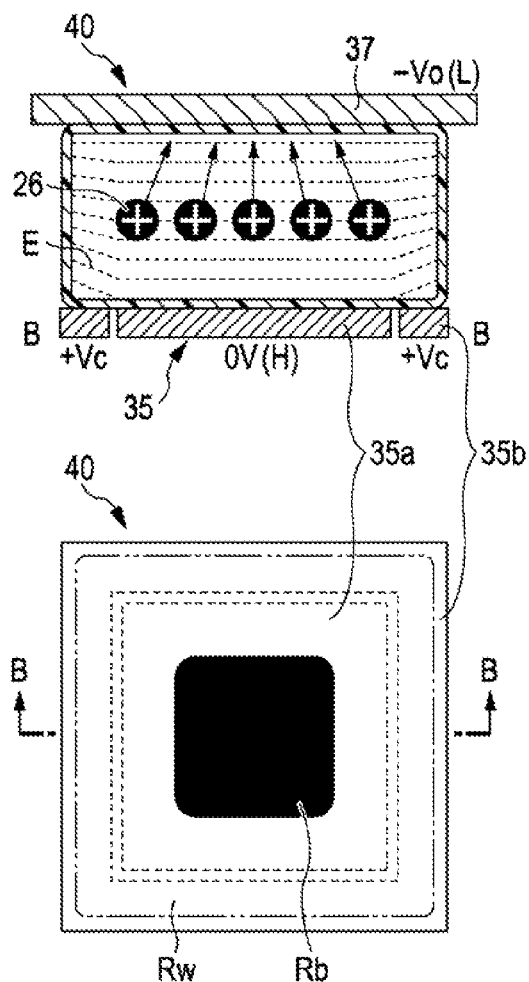
FIG. 5A
FIG. 5B

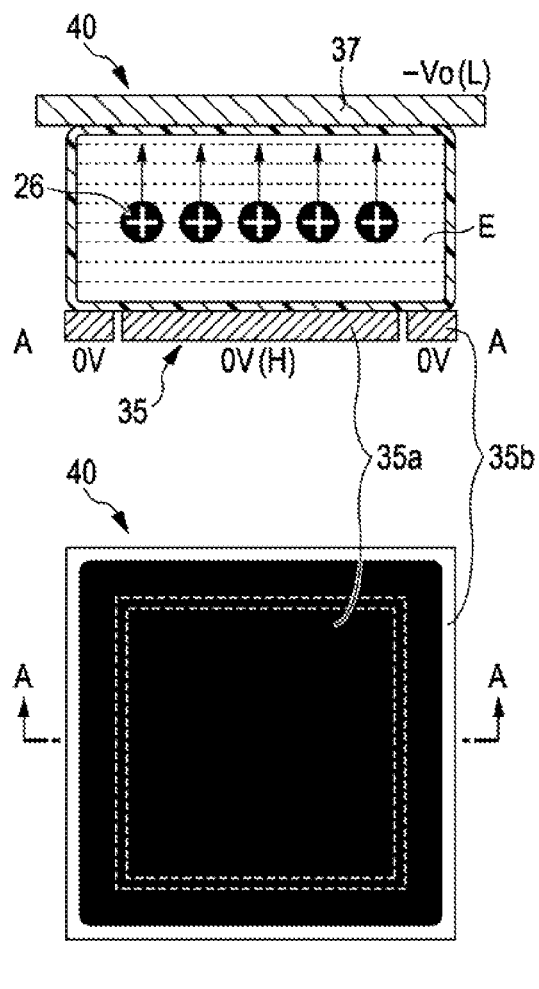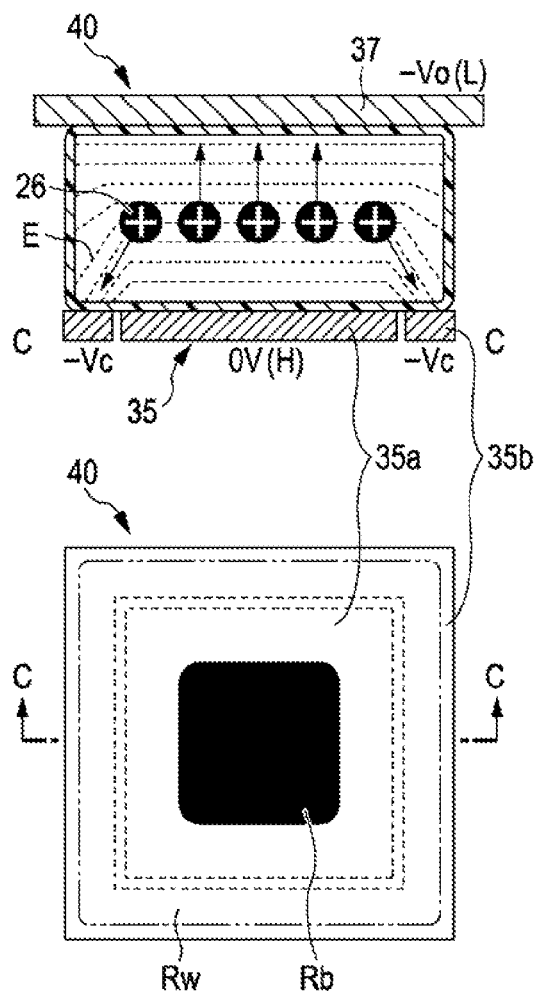

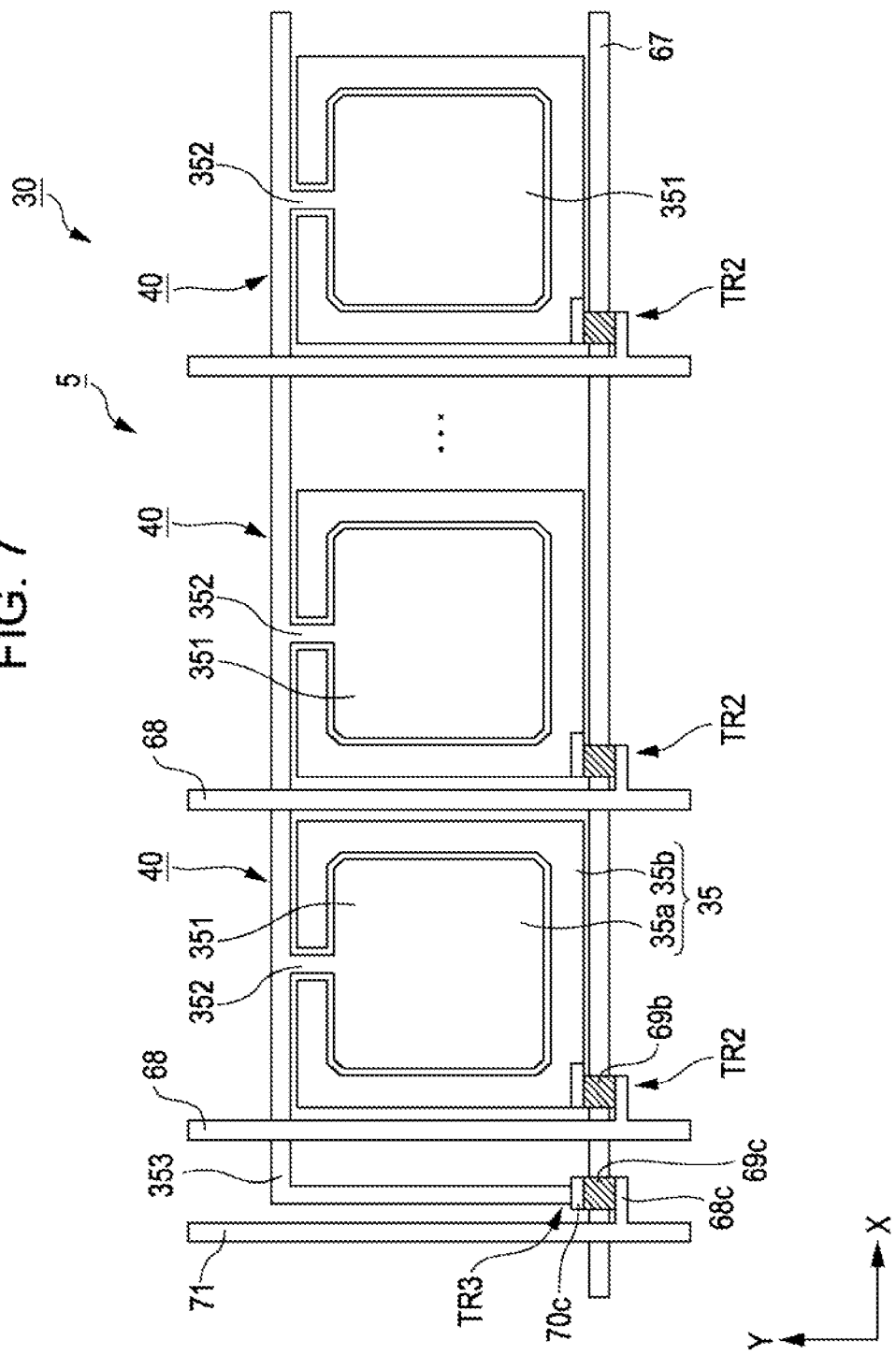

ELECTROPHORETIC DISPLAY DEVICE, DRIVING METHOD THEREOF, AND ELECTRONIC APPARATUS

BACKGROUND

1. Technical Field

The present invention relates to an electrophoretic display device, a driving method thereof, and an electronic apparatus.

2. Related Art

An electrophoretic display device capable of performing intermediate gradation display has been known as a device in which a plurality of sub pixels may be installed within a single pixel, and white display and black display may be switched for each sub pixel, and thereby gradation of the pixel may be controlled (for example, see JPA-2006-309131).

In an electrophoretic display device disclosed in JP-A-2006-309131, since there is no need to perform intermediate gradation display with respect to each of the sub pixels constituting a pixel, an effect in which the electrophoretic display device is excellent in the reproducibility of a display color in the intermediate gradation may be obtained. However, there is a problem in that the number of sub pixels is required to be increased to increase the number of gradations.

SUMMARY

An advantage of some aspects of the invention is to provide an electrophoretic display apparatus and a driving method thereof, in which a multi-gradation display is achieved without increasing the number of sub pixels.

According to an aspect of the invention, there is provided an electrophoretic display device in which an electrophoretic element is interposed between a pair of substrates, the electrophoretic display device including: a first electrode and a second electrode that are formed in each pixel on one substrate; and an opposing electrode that is formed on another substrate and faces the first electrode and the second electrode through the electrophoretic element. Here, a gradation may be displayed due to a difference in potential between the first electrode and the second electrode.

In this configuration, it is possible to freely control an arrangement state of electrophoretic particles in the electrophoretic element due to a lateral electric field or distortion of an electric field generated due to the difference in potential between the first electrode and the second electrode. Thus, according to the invention, an electrophoretic display device in which a multi-gradation display is achieved without increasing the number of sub pixels may be implemented.

It is preferable that the gradation is displayed by controlling the size of a display area of a predetermined gradation on the first electrode. For example, a reflection density of a pixel recognized by a user may differ by changing the size of a black display area within a single pixel, and thereby intermediate gradation may be smoothly displayed. In addition, the display area of the predetermined gradation itself may be different from an area of the intermediate gradation, and for example, may be a black display or a white display. Accordingly, a response time may be prevented from differing due to a gradation value, such as the case where intermediate gradation display is performed by stopping the driving of the electrophoretic element in the middle of the driving.

It is preferable that the gradation is displayed by controlling a ratio of first gradation and a second gradation in the pixel region. From this, a smooth multi-gradation display may be obtained.

It is preferable that the electrophoretic display device further includes a first switching element that is connected to the first electrode and a second switching element that is connected to the second electrode. Here, an input terminal of the first switching element and an input terminal of the second switching element may be connected by a common data line.

Due to this configuration, since an image signal can be input using one data line with respect to the first electrode and the second electrode, the number of data lines may be reduced, and the scale of a driving circuit may be reduced.

It is preferable that a plurality of the first electrodes is connected to each other. Due to this configuration, since the plurality of first electrodes can be collectively controlled, the scale of the driving circuit may be reduced while the number of pixel switching elements may be reduced.

It is preferable that the electrophoretic display device further includes a third switching element that is connected to the first electrode and a second switching element that is connected to the second electrode. Here, a control terminal of the third switching element and a control terminal of the second switching element may be connected by a common scan line.

Due to this configuration, since an on/off operation of the second switching element and the third switching element can be controlled by an input of a selection signal through one scan line, the number of scan lines and the scale of the driving circuit may be reduced.

It is preferable that the first electrode includes an island-shaped portion that is arranged in a center portion of the pixel and a connection wiring portion that extends from the island-shaped portion. It is preferable that the second electrode is formed along an outer edge of the island-shaped portion.

Due to this configuration, it is possible to provide the electrophoretic display device in which the intermediate gradation display may be performed by controlling the size of the display area of the predetermined gradation formed on the first electrode in the center portion of the pixel.

It is preferable that the second electrode, an insulation film that covers the second electrode, and the first electrode that is partially formed on the insulation film are formed in this order on the substrate.

Due to this configuration, in the case where the difference in potential is generated between the first electrode and the second electrode, an electric field in an oblique direction may be generated between an end edge (edge portion) of the first electrode and the second electrode in the vicinity thereof, and a part of the electrophoretic element may be prevented from being moved towards the opposing electrode side by the oblique electric field. Due to this, multiple steps of intermediate gradation display may be achieved.

It is preferable that the first electrode is an electrode with a comb tooth shape.

Due to this configuration, the display area of the predetermined gradation may be formed in a plane area corresponding to the electrode with a comb tooth shape, and a width (thickness) of the display area may be changed, and thereby the intermediate gradation display where a gradation value differs may be achieved.

It is preferable that the electrophoretic display device further includes a protrusion that is formed on the first electrode or the second electrode to protrude from the first electrode or the second electrode toward the electrophoretic element side.

Due to this configuration, the protrusion which is a solid component may protrude toward the electrophoretic element, and thereby an electric field in the lateral direction (in the substrate surface direction) may be easily formed within the electrophoretic element. Due to this, a function where a part of the electrophoretic element is held so that it is not moved towards the opposing electrode side may be more certainly obtained, thereby improving controllability of the intermediate gradation display.

Next, according to an aspect of the invention, there is provided a method of driving an electrophoretic display device in which an electrophoretic element is interposed between a pair of substrates, the electrophoretic display device including a first electrode and a second electrode that are formed in each pixel on one substrate; and an opposing electrode that is formed on another substrate and faces the first electrode and the second electrode through the electrophoretic element, the method including: inputting an electric potential for displaying a first gradation to the pixel between the first electrode and the opposing electrode while inputting a predetermined electric potential to the second electrode; and displaying, on the pixel, a gradation based on a difference in potential between the first electrode and the second electrode.

Due to this method, multiple steps of intermediate gradation display may be achieved without increasing the number of sub pixels.

It is preferable that the method further includes controlling the size of a display area of the first gradation on the first electrode due to the difference in potential between the first electrode and the second electrode.

It is preferable that the method further includes controlling a ratio of a display area of the first gradation within the pixel and a ratio of a display area of a second gradation different from the first gradation, due to the difference in potential between the first electrode and the second electrode.

Due to these driving methods, smooth intermediate gradation display may be achieved, and at the same time, a response speed may be prevented from differing due to the display intermediate, thereby reducing a sense of incongruity at the time of being recognized by a user.

According to an aspect of the invention, there is provided an electronic apparatus that may include the above described electrophoretic display device.

Due to this configuration, it is possible to provide the electronic apparatus including a display unit in which a multi-gradation display may be achieved without increasing the number of sub pixels.

BRIEF DESCRIPTION OF THE DRAWINGS

The invention will be described with reference to the accompanying drawings, wherein like numbers reference like elements.

FIGS. 3A to 3C are views showing a plurality of main parts of an electrophoretic display device;

FIGS. 5A and 5B are views for describing functions of an electrophoretic display device according to an embodiment;

FIGS. 6A and 6B are views showing an electrophoretic display device according to a first modified example;

FIG. 7 is a view showing an electrophoretic display device according to a second modified example;

DESCRIPTION OF EXEMPLARY EMBODIMENTS

Hereinafter, exemplary embodiments of the invention will now be described in detail with reference to the accompanying drawings. The invention is not limited to the embodiments set forth herein, and can be arbitrarily changed within the scope of the invention. Also, in the following drawings, there are cases of reducing scales or differing numbers between actual configurations and respective configurations of the invention in order to enable the respective configurations to be easily understood.

Figure 1:
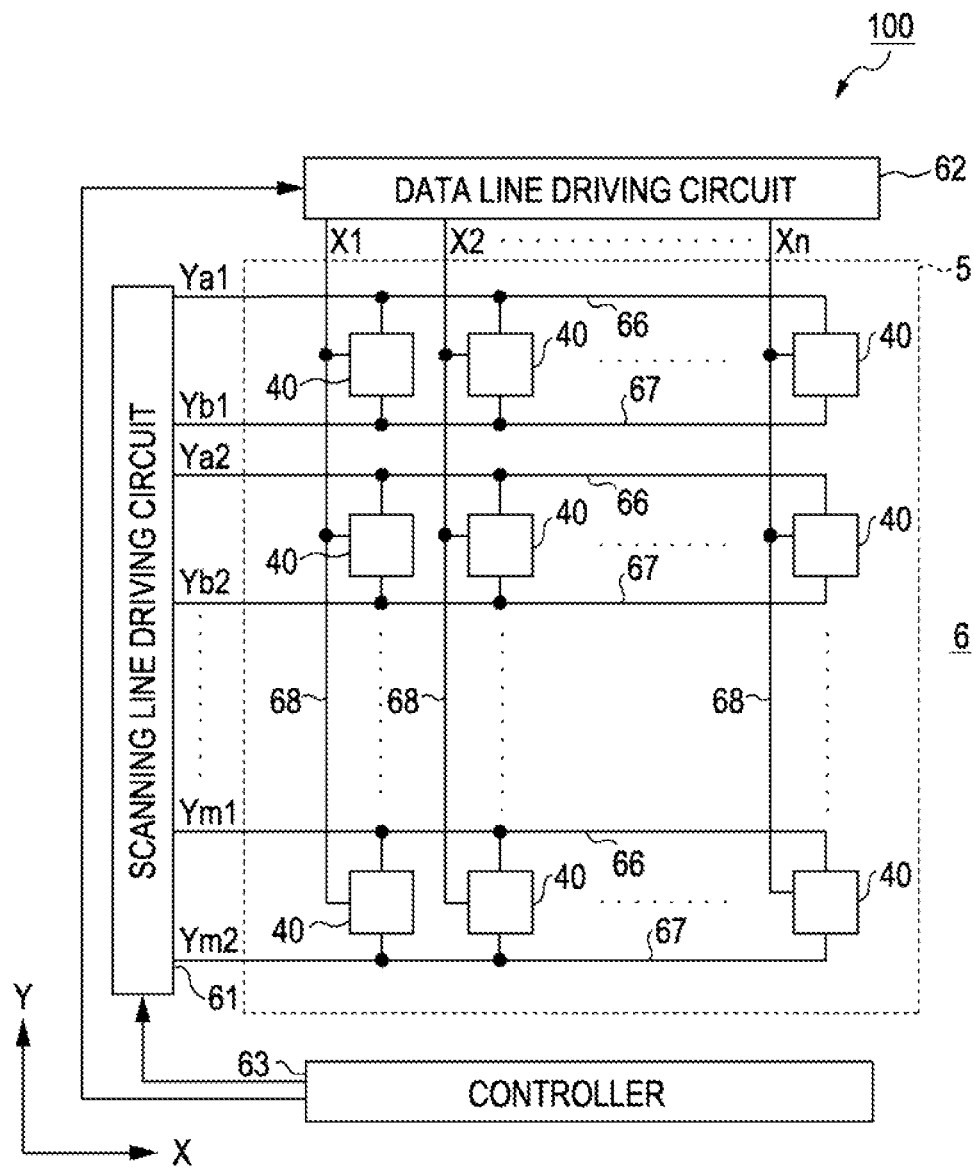
FIG. 1 is a schematic configuration view showing an electrophoretic display device according to an embodiment.

FIG. 1 schematically shows a configuration of an electrophoretic display device 100 according to an embodiment of the invention.

The electrophoretic display device 100 includes a display section 5 where a plurality of pixels 40 is arranged in a matrix shape. A scanning line driving circuit 61, a data line driving circuit 62, and a controller 63 (control section) are arranged in the periphery of the display section 5. The scanning line driving circuit 61 and the data line driving circuit 62 each is connected to the controller 63. The controller 63 totally controls the driving circuits based on image data and synchronization signals that are provided from a higher-level device.

In the display section 5, a plurality of first and second scanning lines 66 and 67 that are extended from the scanning line driving circuit 61, and a plurality of data lines 68 that are extended from the data line driving circuit 62 may be formed. The pixels 40 are provided to correspond to an intersection position between the first scanning line 66 and the data line 68. Each of the pixels 40 is connected to the first scanning line 66, the second scanning line 67, and the data line 68.

The scanning line driving circuit 61 is connected to each of the pixels 40 through an m-numbered first scanning lines 66 (Ya1, Ya2, . . . , Yam) and an m-numbered second scanning lines 67 (Yb1, Yb2, . . . , Ybm), and thereby may sequentially select the first scanning lines 66 and the second scanning lines 67 each from a first column to an m-th column under control of the controller 63, and supply a selection signal for defining on-timing each of a first transistor TR1 (first switching element; see FIG. 2) and a second transistor TR2 (second switching element; see FIG. 2) which are provided in the pixel 40. More specifically, the selection signal is supplied to the first transistor TR1 through the first scanning line 66, and supplied to the second transistor TR2 through the second scanning line 67. In the above mentioned operation, the first scanning line 66 and the second scanning line 67 which are connected to the same pixel 40 may be sequentially selected without being selected at the same time. Further, it is preferable that the scanning line driving circuit for driving the first scanning line 66 and the scanning line driving circuit for driving the second scanning line 67 is provided as separate circuits.

The data line driving circuit 62 is connected to each of the pixels 40 through an n-numbered data lines 68 (X1, X2, . . . , Xn), and thereby may supply, to the pixel 40, an image signal for defining pixel data corresponding to each of the pixels 40 under control of the controller 63. According to the embodiment, the data line driving circuit 62 supplies a first image signal for defining a reference gradation of the pixel 40 to the first transistor TR1, while supplying, to the second transistor TR2, a second image signal for defining a displacement width from the reference gradation. Accordingly, the controller 63 generates one set of the first image signal and the second image signal from the image data (pixel data) input from the higher-level device, and may sequentially supply the generated one set of image signals to the data line driving circuit 62.

Figure 2:
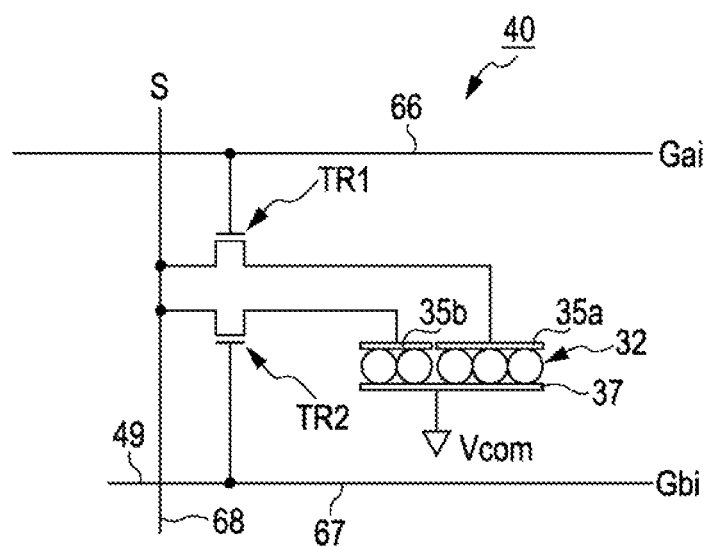
FIG. 2 is a view showing a pixel circuit.

FIG. 2 shows a configuration of the circuit of the pixel 40.

In the pixel 40, the first transistor TR1, the second transistor TR2, a first electrode 35a, a second electrode 35b, an electrophoretic element 32, and a common electrode 37 (opposing electrode) are provided. Also, the pixel 40 is connected to the first scanning line 66, the second scanning line 67, and the data line 68. Both the first transistor TR1 and the second transistor TR2 are a Negative Metal Oxide Semiconductor (N-MOS) transistor.

In the pixel 40, the first scanning line 66 may be connected to a gate of the first transistor TR1, the data line 68 is connected to a source, and the first electrode 35a is connected to a drain. The second scanning line 67 is connected to a gate of the second transistor TR2, the data line 68 common to the first transistor TR1 is connected to the source, and the second electrode 35b is connected to the drain.

Further, the first transistor TR1 and the second transistor TR2 are replaced by another type of a switching element having the same functions as those thereof. For example, a P-MOS transistor is used instead of the N-MOS transistor, and an inverter or a transmission gate may be used.

In addition, a holding capacitor may be provided in the pixel 40. In the case where the holding capacitor is provided, a first holding capacitor connected to the first electrode 35a and adopted for holding the first image signal, and a second holding capacitor connected to the second electrode 35b and adopted for holding the second image signal may be preferably provided. However, only one of the first holding capacitor and the second holding capacitor is provided.

According to the embodiment, the first transistor TR1 is a switching element that controls an input of the first image signal for defining the reference gradation with respect to the pixel 40, so that a display color (white or black) of an area where gradation of the pixel 40 is controlled is determined by the input of the first image signal.

On the other hand, the second transistor TR2 is a switching element that controls an input of the second image signal for defining the displacement width from the reference gradation with respect to the pixel 40, so that the size or shape of an area displayed as the reference gradation, which occupies a plane area of the pixel 40, is determined by the input of the second image signal.

Next, FIG. 3A is a partial cross-sectional view showing the display section 5 of the electrophoretic display device 100. The electrophoretic display device 100 has a configuration in which the electrophoretic element 32 where a plurality of microcapsules 20 are arranged is interposed between an element substrate 30 (first substrate) and an opposing substrate 31 (second substrate).

In the display section 5, a circuit layer 34, where the first scanning line 66, the second scanning line 67, the data line 68, the first transistor TR1, the second transistor TR2, and the like are formed, as shown in FIGS. 1 and 2, are provided at a side of the electrophoretic element 32 of the element substrate 30, and a plurality of pixel electrodes 35 (first electrode 35a, second electrode 35b) may be arranged on the circuit layer 34. Further, hereinafter, both the first electrode 35a and the second electrode 35b which are included in a single pixel 40 are referred to as the pixel electrode 35.

The element substrate 30 may be a substrate made of glass or plastic, and may not be a transparent substrate since the element substrate 30 is arranged on a side opposite from an image display surface. The pixel electrode 35 may be an electrode that applies a voltage to a laminate obtained such that a nickel-plated layer and a gold-plated layer are laminated in this order on a copper (Cu) foil, and to the electrophoretic element 32 formed of aluminum (Al), indium tin oxide (ITO), or the like.

Also, a plane-shaped common electrode 37 (opposing electrode) facing the plurality of pixel electrodes 35 may be formed at the electrophoretic element 32 side of the opposing substrate 31, and the electrophoretic element 32 may be provided on the common electrode 37.

The opposing electrode 31 may be a substrate made of glass or plastic, and may be a transparent substrate since the opposing electrode 31 may be disposed in the image display side. The common electrode 37 may be an electrode that applies a voltage to the electrophoretic element 32, together with the pixel electrode 35, and may be a transparent electrode made of an alloy of magnesium and silver (MgAg), ITO, indium zinc oxide (IZO), or the like.

Also, the electrophoretic element 32 and the pixel electrode 35 may be adhered together through an adhesive layer 33, so that the element substrate 30 and the opposing substrate 31 may be joined together.

Further, the electrophoretic element 32 may be formed beforehand at a side of the opposing substrate 31, and may be generally handled as an electrophoretic sheet including up to the adhesive layer 33. In a manufacturing process of the electrophoretic sheet, the electrophoretic sheet may be handled in a state where a protective detachable sheet is bonded to a surface of the adhesive layer 33. In addition, the display section 5 may be formed by bonding, to the separately manufactured element substrate 30 (the pixel electrode 35 and various circuits being formed therein), the electrophoretic sheet in which the detachable sheet is peeled off. Hence, the adhesive layer 33 may only exist at the pixel electrode 35 side.

FIG. 3B shows a type sectional drawing of the microcapsule 20. The microcapsule 20 may have a particle diameter of, for example, about 50 μm, and may be a spherical body where a dispersion medium 21, a plurality of white particles 27 (electrophoretic particles), and a plurality of black particles 26 (electrophoretic particles) are sealed therein. The microcapsule 20 may be interposed between the common electrode 37 and the pixel electrode 35 as shown in FIG. 3A, and one or a plurality of microcapsules 20 may be disposed within a single pixel 40.

An outer shell portion (wall film) of the microcapsule 20 may be formed using a polymer resin having light-transparent property, such as acrylic resin such as poly methyl methacrylate and poly ethyl methacrylate, urea resin, gum arabic, and the like.

The dispersion medium 21 may be a liquid for dispersing the white particles 27 and the black particles 26 in the microcapsule 20. As examples of the dispersion medium 21, water, alcohol solvents (methanol, ethanol, isopropanol, butanol, octanol, methyl cellosolve, and the like), esters (ethyl acetate and butyl acetate), ketones (acetone, methyl ethyl ketone and methyl isobutyl ketone), aliphatic hydrocarbon (pentane, hexane, octane, and the like), alicyclic hydrocarbon (cyclohexane, methylcyclohexane, and the like), aromatic hydrocarbon (benzene, toluene, benzenes having a long chain alkyl group (xylene, hexylbenzene, heptylbenzene, octylbenzene, nonylbenzene, decylbenzene, undecylbenzene, dodecylbenzene, tridecylbenzene, tetradecylbenzene, and the like)), halogenated hydrocarbons (methylene chloride, chloroform, carbon tetrachloride, 1,2-dichloroethane, and the like), carboxylates, and the like may be given, and other oils may also be used. These materials may be used alone or as a mixture thereof, and surfactants and the like may be further mixed therein.

The white particles 27 may be particles (polymer or colloid) including white pigment such as titanium dioxide, zinc oxide, antimony trioxide, and the like, for example, which are negatively charged and used. The black particles 26 may be particles (polymer or colloid) including black pigment such as aniline black, carbon black, and the like, for example, which are positively charged and used.

In these pigments, a charge control agent including particles such as electrolytes, surfactants, metal soaps, resins, rubber, oils, varnishes, compounds, and the like, a dispersion agent such as a titanium-based coupling agent, an aluminum-based coupling agent, a silane-based coupling agent, and the like, lubricants, stabilizer, and the like may be added therein, if necessary.

Also, instead of the black particles 26 and the white particles 27, pigments, for example, a red pigment, a green pigment, a blue pigment, or the like may be used. Due to this configuration, a red color, a green color, a blue color, or the like may be displayed in the display section 5. Also, instead of the two kinds of particles (e.g. the black particles 26 and the white particles 27), one kind of particles may be used.

FIG. 3C is a plan view of the pixel 40 of the element substrate 30. The pixel electrode 35 including the first electrode 35a and the second electrode 35b may be formed in the pixel 40, and the first scanning line 66, the second scanning line 67, and the data line 68 may be formed along a side edge of the pixel electrode 35. The first transistor TR1 may be formed in the vicinity of an intersection portion of the first scanning line 66 and the data line 68, and the second transistor TR2 may be formed in the vicinity of an intersection portion of the second scanning line 67 and the data line 68.

The first electrode 35a may include an island-shaped portion 351 having an approximately square shape in a plan view, and a connection wiring portion 352 that is extended from a side edge of the island-shaped portion 351 toward a side of the first scanning line 66 to be connected to the first transistor TR1. The second electrode 35b may be formed to have a C-ring shape (frame-like shape) along a periphery of the island-shaped portion 351 of the first electrode 35a. The connection wiring portion 352 of the first electrode 35a may be connected to the first transistor TR1, via an opening portion of a C-ring distal end of the second electrode 35b from the island-shaped portion 351.

The first transistor TR1 may include a semiconductor layer 69a that is made of amorphous silicon and polycrystalline silicon and is formed on the first scanning line 66. In the semiconductor layer 69a, a source electrode 68a branched from the data line 68, and the connection wiring portion 352 (drain electrode) of the first electrode 35a may be connected.

The second transistor TR2 may include a semiconductor layer 69b that is made of amorphous silicon and polycrystalline silicon and is formed on the second scanning line 67. In the semiconductor layer 69b, a source electrode 68b branched from the data line 68, and a rectangular drain electrode 70b may be connected. The drain electrode 70b may be connected to the second electrode 35b.

Figure 4A:
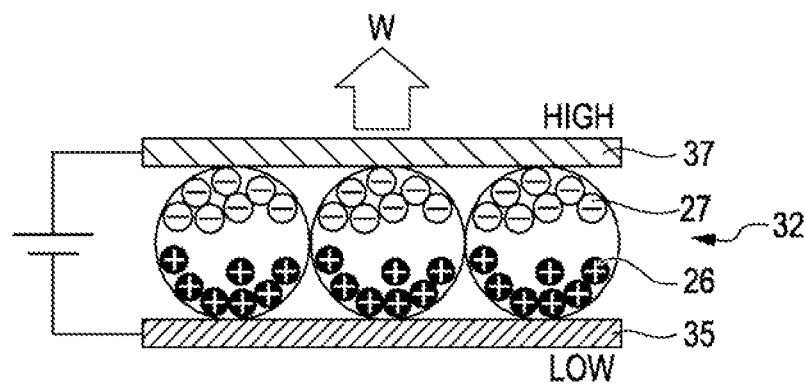
FIGS. 4A and 4B are views for describing basic operations of an electrophoretic element.
Figure 4B:
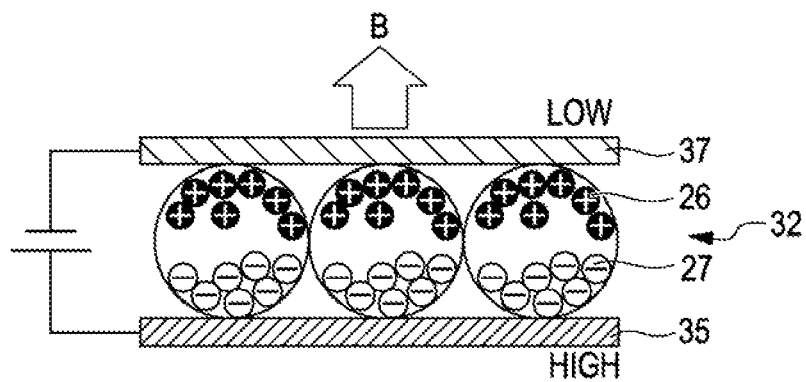

FIGS. 4A and 4B show basic operations of an electrophoretic element. FIG. 4A shows a case where the pixel 40 is entirely displayed in white, and FIG. 4B shows a case where the pixel 40 is entirely displayed in black.

In the case of the white display shown in FIG. 4A, the common electrode 37 may have a relatively high potential, and the pixel electrode 35 may have a relatively low potential. Thus, the negatively charged white particles 27 may attract towards the common electrode 37, and the positively charged black particles 26 may attract towards the pixel electrode 35. As a result, when this pixel is viewed from a side of the common electrode 37 functioning as a display surface, a white color (W) may be recognized.

In the case of the black display shown in FIG. 4B, the common electrode 37 may have a relatively low potential, and the pixel electrode 35 may have a relatively high potential. Thus, the positively charged black particles 26 may attract towards the common electrode 37, and the negatively charged white particles 27 may attract towards the pixel electrode 35. As a result, when this pixel is viewed from the side of the common electrode 37, a black color (B) may be recognized.

FIG. 5A shows a case where the pixel 40 of the electrophoretic display device 100 according to the embodiment are displayed in black, and FIG. 5B shows a case where intermediate gradation display (gray display) is performed with respect to the pixel 40. In FIGS. 5A and 5B, upper views are cross-sectional views of the pixel 40, and lower views are plan views of the pixel 40.

As shown in FIG. 5A, when the pixel 40 is entirely displayed in black, a negative potential −Vo (Vo>0[V]) may be input to the common electrode 37, and 0V may be input to the first electrode 35a and the second electrode 35b. Thus, the pixel electrode 35 (first electrode 35a and second electrode 35b) may have a relatively high potential, and the common electrode 37 may have a relatively low potential, and thereby the pixel 40 may be displayed in black (see FIG. 4B).

In this instance, since both the first electrode 35a and the second electrode 35b become 0V, an equal potential face E on the pixel electrode 35 may be formed parallel to the pixel electrode 35 and the common electrode 37 within a plane area of the pixel 40, as shown in FIG. 5A. Thus, the electrophoretic particles (black particles 26) may be moved along a direction (substrate normal direction) where the pixel electrode 35 and the common electrode 37 face each other, and the black particles 26 may be distributed almost in the entire plane area in the display surface side (common electrode 37 side) of the pixel 40. Thus the pixel 40 is entirely displayed in black.

On the other hand, when the intermediate gradation display is performed with respect to the pixel 40, a positive potential +Vc (Vc>0[V]) may be input to the first electrode 35a and the second electrode 35b, as shown in FIG. 5B. In this manner, since the high-low potential relation between the respective electrodes of the pixel 40 may satisfy "second electrode 35b (+Vc)>first electrode 35a (0V)>common electrode 37 (−Vo)", the pixel electrode 35 (first electrode 35a and second electrode 35b) has a relatively high potential and the common electrode 37 has a relatively low potential, similar to those in FIG. 5A. Accordingly, even in the case shown in FIG. 5B, the positively charged black particles may attract towards the common electrode 37, and the negatively charged white particles may attract towards the first electrode 35a and the second electrode 35b.

However, in the case shown in FIG. 5B, since a difference in potential may be generated between the first electrode 35a and the second electrode 35b, the equal potential face on the second electrode 35b at a periphery of the pixel 40 may be distorted towards the common electrode 37 side to have a concave shape (bowl shape) as shown in drawings, and the black particles at the periphery of the pixel 40 may be moved to a central portion of the pixel 40. In this manner, when the black particles exist unevenly in the central portion of the pixel 40, the white particles which have attracted towards the side of the pixel electrode 35 (particularly, strongly attracting towards the second electrode 35*b*) may be recognized in the periphery of the pixel 40 where the black particles do not exist, so that a black display area Rb and a white display area Rw may be formed within a single pixel 40. Also, intermediate gradation display corresponding to an area ratio (percentage) of the black display area Rb and the white display area Rw may be recognized by the eye of a user.

In addition, according to the embodiment, the area ratio of the black display area Rb and the white display area Rw may be freely controlled by changing a difference in potential between the first electrode 35*a* and the second electrode 35*b* in a state where a potential of the common electrode 37 is fixed. When the difference in potential between the first electrode 35*a* and the second electrode 35*b* is changed, a shape of the equal potential face shown in the upper cross-sectional view of FIG. 5B may be changed, which is because a direction of an electric field for driving the electrophoretic particles located in the periphery of the pixel 40 is changed.

Accordingly, in a method of driving the electrophoretic display device 100 according to the embodiment, when a potential level Vc of a second pixel signal input to the second electrode 35*b* is changed while a first image signal of a fixed potential level (for example, 0V) is input to the first electrode 35*a*, display gradation of the pixel 40 may be freely controlled. Controllability of the display gradation in this case may depend on the number of stages (types of voltage) of the potential level Vc capable of being supplied as the second image signal, and gradation capable of being displayed may increase along with an increase the number of stages.

In the electrophoretic display device 100 according to the embodiment, the pixel electrode 35 of the pixel 40 may include the first electrode 35*a* and the second electrode 35*b*, and the display gradation of the pixel 40 may be controlled by the difference in potential between the first electrode 35*a* and the second electrode 35*b*, so that multiple steps of intermediate gradation display may be achieved without increasing the number of sub pixels. Also, since there is no need to configure the pixel 40 using a plurality of sub pixels, the electrophoretic display device 100 may have excellent productivity, and high precision of the electrophoretic display device 100 may be easily satisfied. Also, the required performance of the driving circuit may be reduced.

In addition, to simplify the above description, the potential of the first electrode 35*a* is set to 0V which is a reference value. However, in the practical image display operations, a potential different from the potential described above may be input to the pixel electrode 35 and the common electrode 37. For example, in the case of the black display shown in FIG. 5A, 15V may be input to the first electrode 35*a* and the second electrode 35*b*, and 0V may be input to the common electrode 37. In the case of the intermediate gradation display shown in FIG. 5B, 15V may be input to the first electrode 35*a*, 20V may be input to the second electrode 35*b*, and 0V may be input to the common electrode 37.

In addition, according to the embodiment, since the intermediate gradation may be displayed by the area ratio of the black display area Rb and the white display area Rw, uniformity of reflectivity (concentration) of the intermediate gradation may be improved, in comparison with a method in which the intermediate gradation display is performed by stopping the driving of the electrophoretic element 32 while switching the pixel 40 from, for example, the black display to the white display.

Further, since a response is fast in the pixel 40 of the intermediate gradation and a response is slow in the pixel 40 of the white display when the intermediate gradation is displayed by stopping the driving while switching from the black display to the white display, a sense of incongruity may be given to a user. In contrast, in the electrophoretic display device 100 according to the embodiment, since a response time of the pixel 40 displaying the intermediate gradation and the pixel 40 displaying in black or in white may become equal, the above described sense of incongruity may not be given to the user.

Modified Example

Hereinafter, modified examples of the invention will be described in detail with reference to the accompanying drawings. In the drawings, like reference numerals denote like components of the electrophoretic display device 100 according to the above described embodiments, and thus detailed descriptions thereof will be omitted.

First Modified Example

FIGS. 6A and 6B show a case where intermediate gradation display is performed with respect to the pixel 40 by a driving method according to a first modified example. FIG. 6A shows a case where the pixel 40 is displayed in black, which is the same as that in FIG. 5A according to the above described embodiment. On the other hand, FIG. 6B shows a case where intermediate gradation display (gray display) is performed with respect to the pixel 40 by the driving method of the first modified example. In FIGS. 6A and 6B, upper views are cross-sectional views of the pixel 40, and lower views are plan views of the pixel 40.

According to the above described embodiment, the case where a potential higher than that input to the first electrode 35*a* is input to the second electrode 35*b* has been described. However, the potential of the second electrode 35*b* may be lower than that of the first electrode 35*a*. That is, as shown in FIG. 6B, a negative potential −Vc (Vc>0[V]) may be input to the second electrode 35*b* in a state where the first electrode 35*a* is 0V and the common electrode 37 is a negative potential −Vo (Vo>0[V]).

In this manner, as shown in the cross-sectional view of FIG. 6B, since a potential may become lower in the periphery of the pixel electrode 35 where the second electrode 35*b* is formed, the equal potential face E may become a convex shape as shown in the drawing, so that a strong transverse electric field may be generated between the first electrode 35*a* and the second electrode 35*b*.

Due to this function of the electric field, a part of the black particles 26 located on the first electrode 35*a* may attract towards the common electrode 37 due to the electric field generated between the first electrode 35*a* and the common electrode 37. However, a part of the black particles 26 located in the periphery of the pixel 40 may attract towards the second electrode 35*b* due to the transverse electric field between the first electrode 35*a* and the second electrode 35*b*. Also, it may become difficult for the electrophoretic element 32 between the second electrode 35*b* and the common electrode 37 to perform the black display, in comparison with on the first electrode 35*a*.

Due to the above described operation, in the pixel 40 shown in FIG. 6B, since only a partial area (center portion) on the first electrode 35*a* may be displayed in black (black display area Rb), and other areas (periphery) may be displayed in white (white display area Rw), the intermediate gradation display may be entirely performed with respect to the pixel 40.

Further, according to the first modified example, concentration of the black display may be controlled without moving a part of the black particles 26 towards the side of the common electrode 37, and thereby the black display area Rb and the white display area Rw may not be precisely separated as shown in FIG. 6B. As a result, the pixel 40 may be entirely displayed in black, or a gray display area may be formed in a periphery of the black display area Rb.

In addition, according to the first modified example, an area ratio of the black display area Rb and the white display area Rw may be freely controlled when changing a difference in potential between the first electrode 35a and the second electrode 35b in a state where a potential of the common electrode 37 is fixed. When changing the difference in potential between the first electrode 35a and the second electrode 35b, intensity of the transverse electric field generated between the first electrode 35a and the second electrode 35b may be changed, which is because a ratio of the black particles 26 that attracts towards the second electrode 35b may be changed.

Accordingly, in the driving method of the first modified example, when a potential level −Vc of a second image signal input to the second electrode 35b is changed while a first image signal of a fixed potential level (for example, 0V) is input to the first electrode 35a, the display gradation of the pixel 40 may be freely controlled. Controllability of the display gradation of this case may depend on the number of stages (types of voltage) of the potential level Vc capable of being supplied as the second image signal, and displayable gradation may increase along with an increase in the number of the stages.

Due to the driving method of the first modified example as described above, multiple steps of intermediate gradation display may be achieved without increasing the number of sub pixels, similar to the above described embodiments.

In addition, to simplify the above description, the potential of the first electrode 35a is 0V which is a reference value. However, in the practical image display operations, a potential different from the above may be input to the pixel electrode 35 and the common electrode 37. For example, in the case of the intermediate gradation display shown in FIG. 6B, 15V may be input to the first electrode 35a, 5V may be input to the second electrode 35b, and 0V may be input to the common electrode 37.

In addition, according to the first modified example, since the intermediate gradation may be displayed by the area ratio of the black display area Rb and the white display area Rw, uniformity of reflectivity (concentration) of the intermediate gradation may be improved, in comparison with a method in which the intermediate gradation is displayed by stopping a driving of the electrophoretic element 32 while switching the pixel 40 from, for example, the black display to the white display. Further, since a response time of the pixel 40 displaying the intermediate gradation and the pixel 40 displaying in black or in white may become equal, a sense of incongruity may not be given to the user at the time of display operation.

Second Modified Example

Next, FIG. 7 shows a plane configuration of the element substrate 30 of the electrophoretic display device according to a second modified example.

The electrophoretic display device according to the second modified example may include a power line 71 and a third transistor TR3 (third switching element), instead of the first scanning line 66 and the first transistor TR1 shown in FIG. 1 and FIG. 3C. More specifically, in the display section 5, the power line 71 may be a common wiring (global wiring) that is extended substantially parallel to the data line 68, and the third transistor TR3 may be formed to correspond to an intersection portion of the power line 71 and a scanning line 67. A gate of the third transistor TR3 may be connected to the scanning line 67, a source may be connected to the power line 71, and a drain may be connected to a common wiring portion 353. The common wiring portion 353 may be extended from the third transistor TR3 to an area where the pixel 40 of the display section 5 is arranged, and a part of the common wiring portion 353 that is extended along the scanning line 67 may be connected to the first electrode 35a (connection wiring portion 352) of the pixel 40. That is, the common wiring portion 353 may be connected to a group of the pixels 40 belonging to the scanning line 67 connected to the common third transistor TR3.

In image display operations of the electrophoretic display device according to the second modified example which has the above described configuration, an image writing operation may be carried out by the scanning line driving circuit 61 and the data line driving circuit 62 in a state where the power line 71 is maintained to have a predetermined potential (for example 0V).

Specifically, when a selection signal may be input through the scanning line 67, the second transistor TR2 and the third transistor TR3 of which a gate is connected to the scanning line 67 may be turned on. Due to this, the predetermined potential (0V) may be input to the common wiring portion 353 through the third transistor TR3, and all of a group of the first electrodes 35a connected to the common wiring portion 353 may become 0V.

Also, an image signal from the data line 68 may be input to the second electrode 35b of each of the pixels 40 through the second transistor TR2. The image signal may be a signal for defining a difference in potential with the first electrode 35a generated based on image data. In the pixel 40 enabling the intermediate gradation to be displayed, a positive potential (+Vc) or a negative potential (−Vc) may be input as the image signal, and in the pixel 40 which displays entirely in black, the same potential (0V) as that of the first electrode 35a may be input as the image signal. Also, in the pixel 40 where a display is not rewritten, the same potential as that of the common electrode 37 may be input.

Due to the above described operations, in each of the pixels 40, the intermediate gradation display may be achieved based on the difference in potential between the first electrode 35a and the second electrode 35b similar to the above described embodiments.

Due to the above described second modified example, a plurality of first electrodes 35a may be connected to each other through the common wiring portion 353, and potentials of the first electrodes 35a may be collectively controlled. For this, the number of scanning lines may be reduced in comparison with the embodiment shown in FIG. 1, so that the scale of the scanning line driving circuit 61 may be reduced.

Further, a potential of the common wiring portion 353 may be provided from the power line 71 through the third transistor TR3. However, the potential of the common wiring portion 353 may be separately controlled. For example, it is possible that the potential thereof may be provided directly from a circuit (not shown) installed in the outside.

Third Modified Example

The scope of the electrophoretic display device according to the invention is not limited to the above described embodiments and modified examples. In particular, configuration of the pixel 40 may be appropriately modified without departing from the spirit and scope of the invention. In the third modified example, a plurality of configuration examples of the pixel 40 will be described with reference to drawings.

First Configuration Example

Figure 8A:
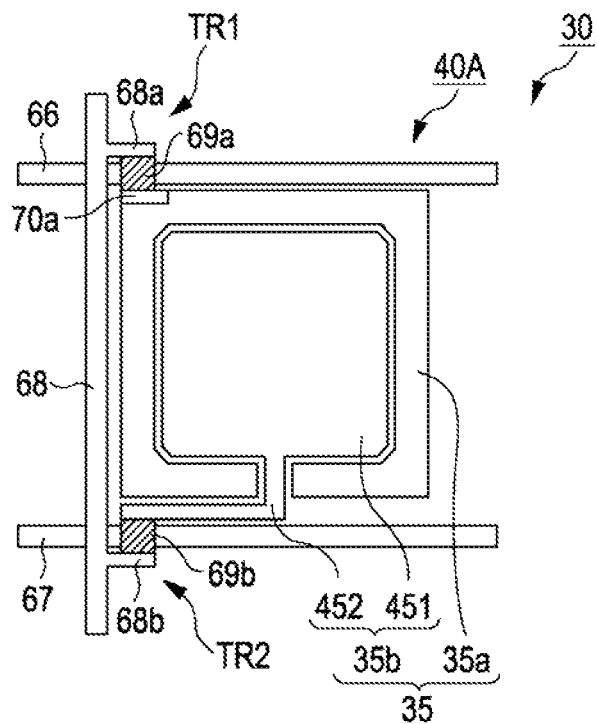
FIGS. 8A and 8B are views showing a configuration of a pixel according to a first configuration example and a second configuration example of a third modified example.

FIG. 8A shows a plan view of a configuration of a pixel according to a first configuration example of the third modified example.

In the pixel 40A according to the first configuration example shown in FIG. 8A, the first electrode 35a of the pixel electrode 35 may be an electrode having a C shape in the plan view contrary to the pixel 40 shown in FIGS. 3A to 3C, and the second electrode 35b may be formed in an area surrounded by the first electrode 35a. The first electrode 35a may be connected to a drain electrode 70a of the first transistor TR1. The second electrode 35b may include an island-shaped portion 451 having a substantially rectangular shape, and a connection wiring portion 452 that is extended from the island-shaped portion 451, and the connection wiring portion 452 and a drain of the second transistor TR2 may be connected to each other.

Even in the electrophoretic display device of the first configuration example having the above described configuration, the first image signal may be input to the first electrode 35a, and the second image signal may be input to the second electrode 35b to thereby control a difference in potential between the first electrode 35a and the second electrode 35b, so that the intermediate gradation display may be performed with respect to the pixel 40 to have a desired gradation.

When driving the electrophoretic display device according to the first configuration example using the first image signal (0V), the second image signal (+Vc) and a common electrode potential (−Vo), which are the same as the example shown in FIG. 5B according to the above described embodiment, the first electrode 35a may be disposed in the periphery of the pixel 40, and thereby the periphery of the pixel 40 may become the black display area Rb, and a central portion of the pixel 40 may become the white display area Rw.

In addition, by changing the difference in potential between the first electrode 35a and the second electrode 35b, a ratio of the black display area Rb and the white display area Rw may be changed, and thereby a desired intermediate gradation display may be performed.

Second Configuration Example

Figure 8B:
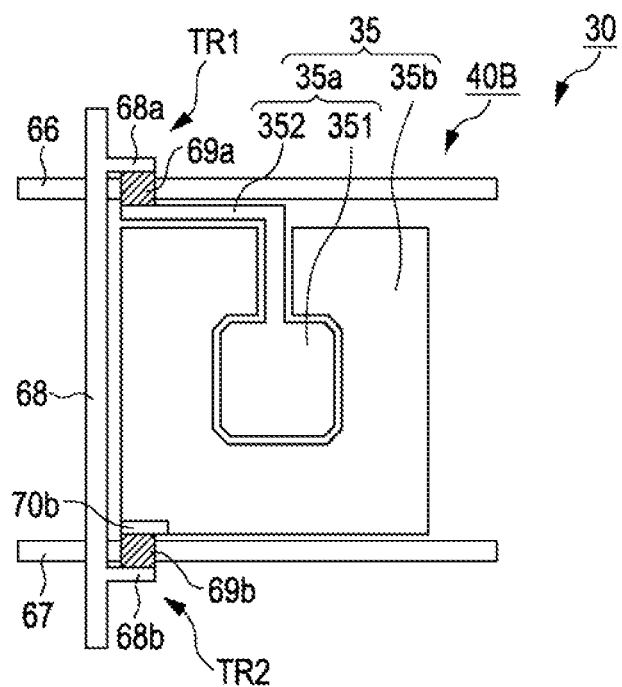

FIG. 8B shows a plan view of a configuration of a pixel according to a second configuration example.

The pixel 40B according to the second configuration example shown in FIG. 8B may be obtained by changing an area ratio of the first electrode 35a and the second electrode 35b in the pixel 40 shown in FIGS. 3A to 3C. Specifically, the island-shaped portion 351 of the first electrode 35a may have about a ½ area of the island-shaped portion 351 shown in FIG. 3C, and a width of the second electrode 35b may be increased by the extent to which the island-shaped portion 351 is reduced.

In this manner, even in the case of changing the area ratio of the first electrode 35a and the second electrode 35b, the first image signal may be input to the first electrode 35a, and the second image signal may be input to the second electrode 35b, and thereby the difference in potential between the first electrode 35a and the second electrode 35b may be controlled, and intermediate gradation display may be performed with respect to the pixel 40 to have desired gradation.

In this example, since the island-shaped first electrode 35a may be reduced, compared with the above described embodiment, the pixel 40 may be controlled in a gradation area closer to the white display when the black display area Rb is formed, for example, on the first electrode 35a.

Third Configuration Example

Figure 9A:
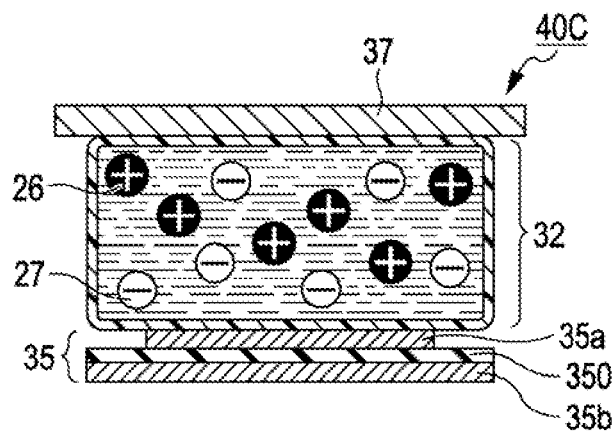
FIGS. 9A to 9C are views showing a configuration of a pixel according to a third configuration example and a fourth configuration example of the third modified example.

FIG. 9A shows a cross-sectional view of a configuration of a pixel according to a third configuration example.

The pixel 40C according to the third configuration example shown in FIG. 9A may have a structure where the first electrode 35a and the second electrode 35b which are arranged in the plane in the pixel 40 shown in FIGS. 3A to 3C are laminated through an insulation film 350. In the pixel 40C, the second electrode 35b may be formed into a substantially rectangular shape in the plan view to have a size corresponding to the pixel 40C, and the insulation film 350 may be formed in such a manner as to cover the second electrode 35b. In addition, the first electrode 35a having a planar dimension smaller than that of the second electrode 35b may be formed on the second electrode 35b through the insulation film 350.

In this manner, even in the electrophoretic display device of the third configuration example where the first electrode 35a and the second electrode 35b are laminated through the insulation film 350, the first image signal may be input to the first electrode 35a, and the second image signal may be input to the second electrode 35b, so that the difference in potential between the first electrode 35a and the second electrode 35b may be controlled, thereby performing the intermediate gradation display with respect to the pixel 40 to have desired gradation.

In this example, when generating the difference in potential between the first electrode 35a and the second electrode 35b, an electric field in an oblique direction from a side cross-section view may be generated between an end edge (edge portion) of the first electrode 35a and the second electrode 35b in the vicinity thereof. Since a part of the electrophoretic element may attract towards a side of the pixel electrode 35 due to the generated electric field, a ratio of the electrophoretic particles attracting towards the side of the common electrode 37 and the electrophoretic particles attracting towards the side of the pixel electrode 35 may be controlled by adjusting intensity of the electric field. Due to this, the pixel 40 may be displayed to have intermediate gradation.

Fourth Configuration Example

Figure 9B:
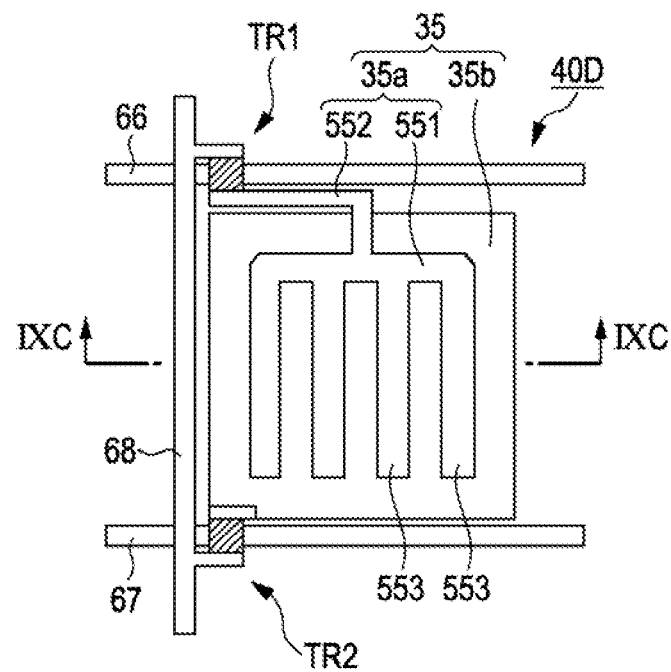
Figure 9C:
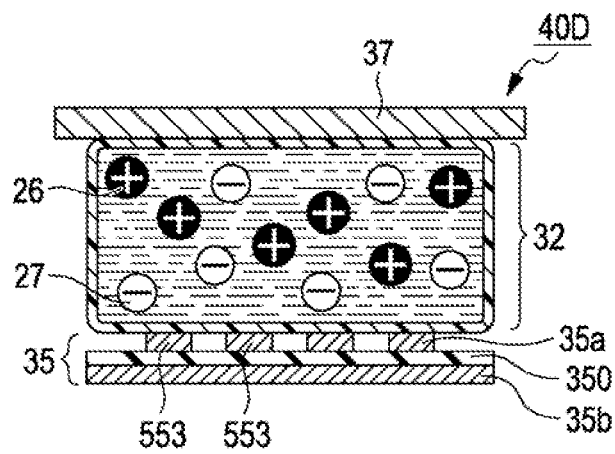

FIG. 9B shows a plan view of a configuration of a pixel according to the fourth configuration example, and FIG. 9C shows a cross-sectional view corresponding to FIG. 9B.

The pixel 40D according to the fourth configuration example shown in FIGS. 9B and 9C may be obtained by changing a planar shape of the first electrode 35a in the pixel 40C shown in FIG. 9A. Specifically, the first electrode 35a of the pixel 40D may include a main electrode portion 551 with a comb tooth shape in the plane view, and an L-shaped connection wiring portion 552 in the plane view which is extended from the main electrode portion 551 to a side of the first scanning line 66. The main electrode portion 551 may include a plurality of strip electrodes 553 (four strip electrodes are shown) that are extended along the data line 68 and arranged in the extending direction of the first scanning line 66. The strip electrodes 553 may be each connected to each other at each end portion of a side of the first scanning line 66.

Based on the cross-sectional view shown in FIG. 9C, the first electrode 35a may be laminated on the second electrode 35b through the insulation film 350.

Even in the electrophoretic display device of the fourth configuration example having the above described configuration, the first image signal may be input to the first electrode 35a, and the second image signal may be input to the second electrode 35b to control the difference in potential between the first electrode 35a and the second electrode 35b, and thereby the intermediate gradation display may be performed with respect to the pixel 40 to have desired gradation.

In this example, when the difference in potential is generated between the first electrode 35a and the second electrode 35b, since the first electrode 35a has the plurality of strip electrodes 553, an electric field in an oblique direction seen from a side cross section may be generated between an end edge (edge portion) of each of the strip electrodes 553 and the second electrode 35b. By adjusting intensity of the electric field, the pixel 40 may be displayed to have intermediate gradation.

When driving the electrophoretic display device according to the fourth configuration example using the first image signal (0V), the second image signal (+Vc) and a common electrode potential (−Vo) which are the same as the example shown in FIG. 5B according to the above described embodiment, a stripped black display area Rb formed along the plurality of strip electrodes 553 of the first electrode 35a may be formed. Also, when changing the difference in potential between the first electrode 35a and the second electrode 35b, a thickness of the stripped black display area Rb may be changed.

Fifth Configuration Example

Figure 10A:
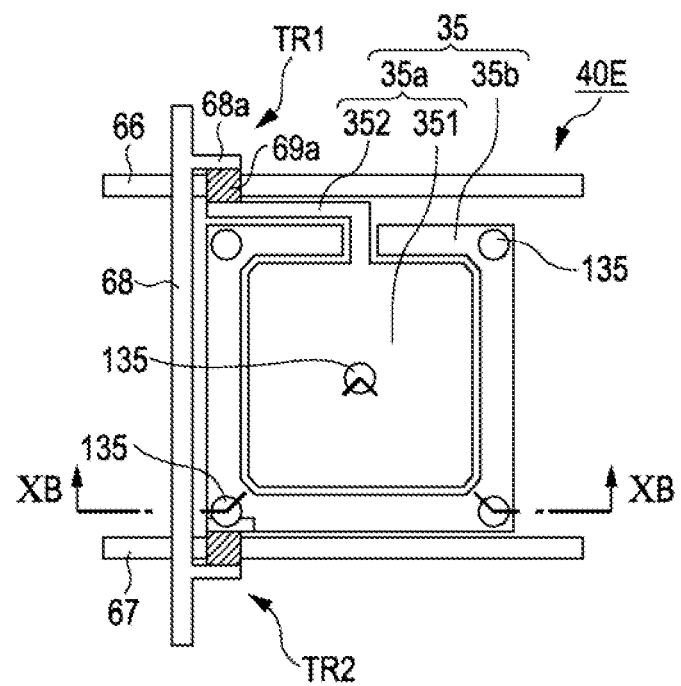
FIGS. 10A and 10B are views showing a configuration of a pixel according to a fifth configuration example of the third modified example.
Figure 10B:
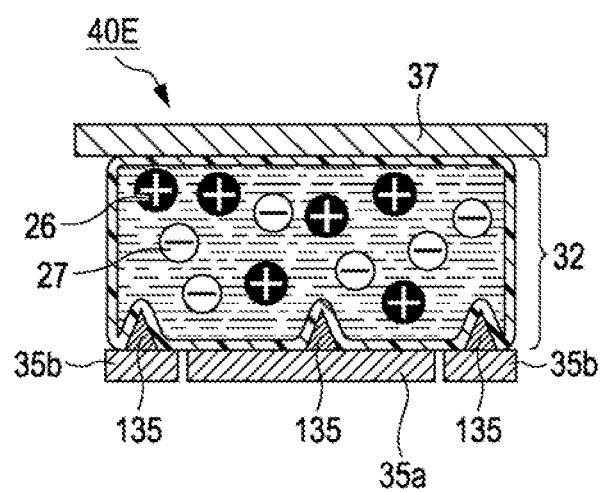

FIG. 10A shows a plan view of a configuration of a pixel according to a fifth configuration example, and FIG. 10B shows a cross-sectional view corresponding to FIG. 10A.

The pixel 40E according to the fifth configuration example shown in FIGS. 10A and 10B may have a configuration where a conical conductive protrusion 135 protruded to the electrophoretic element 32 is provided on the first electrode 35a and the second electrode 35b of the pixel 40 shown in FIGS. 3A to 3C. In this example, the conductive protrusion 135 may be disposed in a central portion of the first electrode 35a and four corners of the second electrode 35b.

The conductive protrusion 135 may be a three-dimensional structure made of metal, an oxide conductor, conductive polymer, or the like, and may protrude from the pixel electrode 35 to enter into the electrophoretic element 32, so that a wall film of the microcapsule may be deformed to have a concave shape as shown in FIG. 10B.

Even in the electrophoretic display device of the fifth configuration example having the above described configuration, the first image signal may be input to the first electrode 35a, and the second image signal may be input to the second electrode 35b to control the difference in potential between the first electrode 35a and the second electrode 35b, and thereby the intermediate gradation display may be performed with respect to the pixel 40 to have desired gradation. Particularly in this example, since an electric field in a transverse direction (substrate surface direction) may be easily formed within the electrophoretic element 32 by providing the conductive protrusion 135, controllability of intermediate gradation may be improved, and the driving power of the electrophoretic element 32 may be reduced.

Further, in this example, the conductive protrusion 135 may be formed into a conical shape. However, the fifth configuration example is not limited thereto. Thus, the conductive protrusion 135 may be formed into a polygonal pyramid shape, a dome shape, or a rectangular shape. Also, the conductive protrusion 135 may be formed as a ridge extending to the first electrode 35a or the second electrode 35b. For example, the conductive protrusion 135 may be formed as a C-shaped ridge (dam-like member) along the second electrode 35b having a C-shape in the plane view. Further, in this example, the conductive protrusion 135 may be disposed within the electrophoretic element 32 in the cross-section view. However, for example, when the adhesive layer 33 is formed between the pixel electrode 35 and the electrophoretic element 32 to bond the pixel electrode 35 and the electrophoretic element 32 together, the conductive protrusion 135 may be disposed only within the adhesive layer 33. Even in this case, since the conductive protrusion 135 may be disposed adjacent to the electrophoretic element 32, the electrophoretic element 32 may be easily driven.

Also, the conductive protrusion 135 may be replaced by a protrusion that does not have conductivity. Even in this configuration, the electrophoretic particles may be easily moved in a transverse direction within the electrophoretic element 32 by deforming the wall film of the microcapsule into a concave shape in comparison with the case where the protrusion is not formed, and thereby controllability of the intermediate gradation may be improved, and a driving power of the electrophoretic element 32 may be reduced.

Further, in the above described embodiment and the modified example thereof, the electrophoretic element 32 may include the microcapsule 20. However, the scope of the invention is not limited thereto. For example, a plurality of spaces partitioned by a partition between the element substrate 30 and the opposing substrate 31 may be planarly arranged, and the electrophoretic particles and the dispersion medium may be sealed in each of the spaces.

Electronic Apparatus

Next, a case where the electrophoretic display device 100 according to the above described embodiment and the electrophoretic display device according to the modified example are applied to an electronic apparatus will be described.

Figure 11:
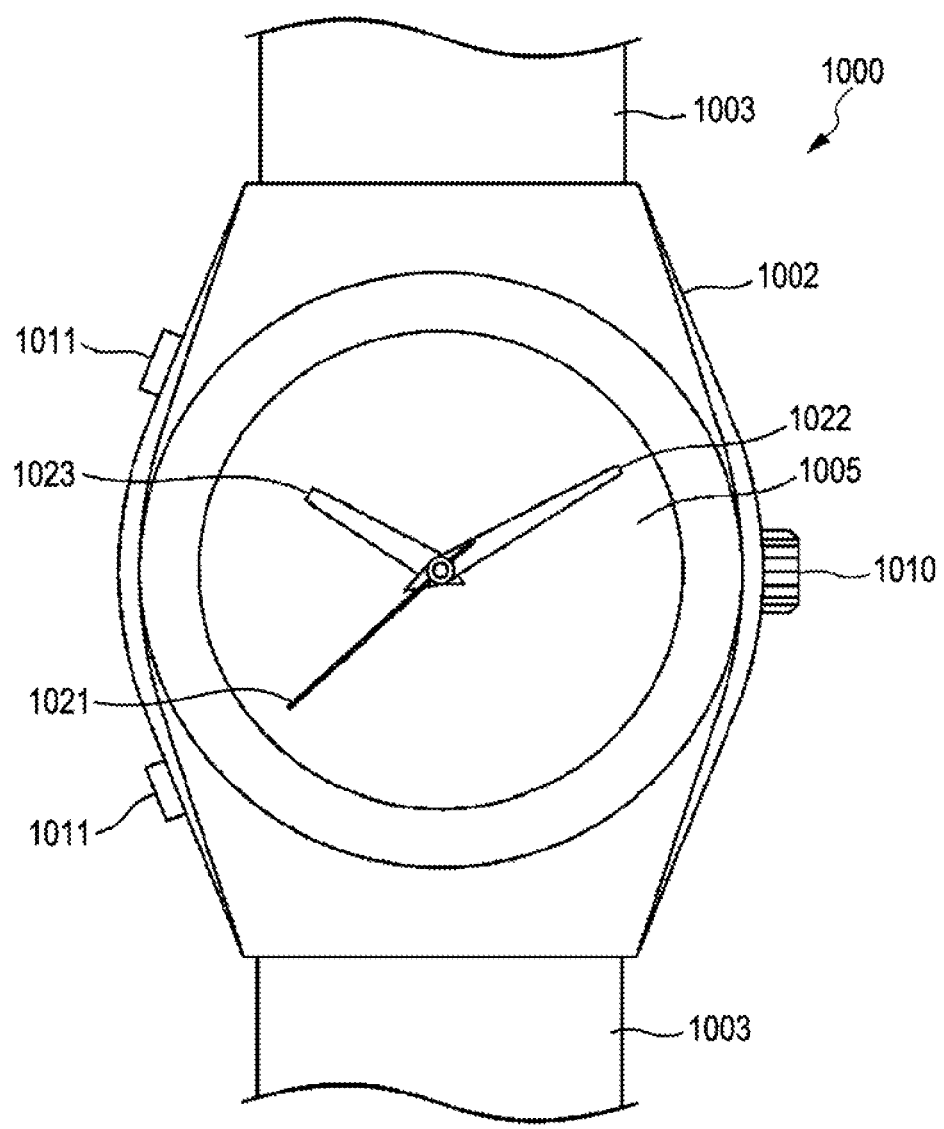
FIG. 11 is a view showing an example of an electronic apparatus.

FIG. 11 shows a front view of a wristwatch 1000. The wristwatch 1000 may include a watch case 1002 and a pair of bands 1003 connected to the watch case 1002.

In a front surface of the watch case 1002, a display section 1005 including the electrophoretic display device according to the above described embodiments, a second hand 1021, a minute hand 1022, and an hour hand 1023 are provided. In a side surface of the watch case 1002, a winding crown 1010 as an operator and an operation button 1011 may be provided. The winding crown 1010 is connected to a winding stem (not shown) provided in the watch case, and may be integrally formed with the winding stem to be freely pushed in or pulled out in a multi-stage (for example, two stages). Also, the winding crown 1010 may be rotatably provided. In the display section 1005, an image as a background and a character string such as date and time may be displayed, or the second hand, the minute hand, the hour hand, or the like may be displayed.

Figure 12:
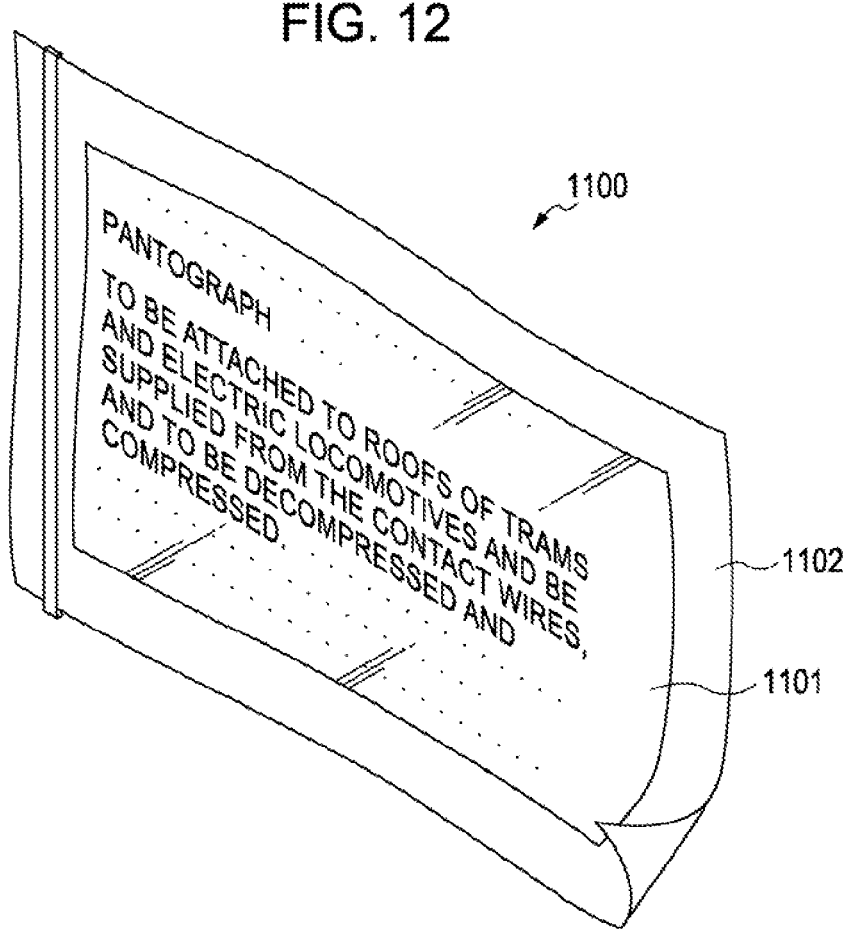
FIG. 12 is a view showing an example of an electronic apparatus.

FIG. 12 shows a perspective view of a configuration of an electronic paper 1100. In the electronic paper 1100, the electrophoretic display device of the above described embodiment may be provided in a display area 1101. The electronic paper 1100 may have flexibility, and may be provided with a main body 1102 including a rewritable sheet having the same texture and flexibility as that of a paper in the related art.

Figure 13:
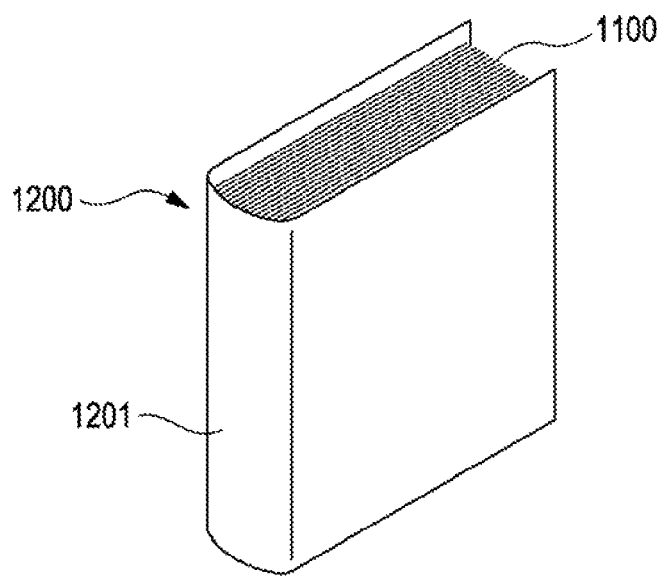
FIG. 13 is a view showing an example of an electronic apparatus.

FIG. 13 shows a perspective view of a configuration of an electronic notebook 1200. The electronic notebook 1200 may be obtained by bundling a plurality of the electronic papers 1100 and inserting the bundled papers in a cover 1201. The cover 1201 may include a display data input unit (not shown) for inputting display data transmitted from, for example, an external device. Thus, in response to the display data, display contents may be changed and updated while the electronic papers remain bundled.

Since the electrophoretic display device according to the invention may be adopted in the above described wristwatch 1000, electronic paper 1100, and electronic notebook 1200, the electronic apparatus including a display unit where a multi-gradation display is achieved using a simple configuration may be obtained.

Further, the above described electronic apparatus may be presented for illustrative purposes only and should not be limited to the scope of the present invention. For example, the electro-optical devices according to the present invention may be suitably used even in a display unit of electronic devices such as mobile phones, portable audio devices, and the like.

The entire disclosure of Japanese Patent Application No. 2009-276411, filed Dec. 4, 2009 is expressly incorporated by reference herein.

What is claimed is:

1. An electrophoretic display device in which an electrophoretic element is interposed between a pair of substrates, the electrophoretic display device comprising:
    a first electrode and a second electrode that are formed in each pixel on one substrate, the first electrode being at least partially surrounded by the second electrode in plan view;
    an opposing electrode that is formed on another substrate, and faces the first electrode and the second electrode through the electrophoretic element;
    a first switching element that is connected to the first electrode; and
    a second switching element that is connected to the second electrode,
    wherein an input terminal of the first switching element and an input terminal of the second switching element are connected by a common data line and a gradation is displayed due to a difference in potential between the first electrode and the second electrode.

2. The electrophoretic display device according to claim 1, wherein the gradation is displayed by controlling the size of a display area of a predetermined gradation on the first electrode.

3. The electrophoretic display device according to claim 1, wherein the gradation is displayed by controlling a ratio of first gradation and a second gradation in the pixel region.

4. The electrophoretic display device according to claim 1, wherein a plurality of the first electrodes is connected to each other.

5. The electrophoretic display device according to claim 4, further comprising:
    a third switching element that is connected to the first electrode; and
    a second switching element that is connected to the second electrode,
    wherein a control terminal of the third switching element and a control terminal of the second switching element are connected by a common scan line.

6. The electrophoretic display device according to claim 1, wherein the first electrode includes an island-shaped portion that is arranged in a center portion of the pixel and a connection wiring portion that extends from the island-shaped portion, and the second electrode is formed along an outer edge of the island-shaped portion.

7. The electrophoretic display device according to claim 1, wherein the second electrode, an insulation film that covers the second electrode, and the first electrode that is partially formed on the insulation film are formed in this order on the substrate.

8. The electrophoretic display device according to claim 7, wherein the first electrode is an electrode with a comb tooth shape.

9. The electrophoretic display device according to claim 1, further comprising:
    a protrusion that is formed on the first electrode or the second electrode to protrude from the first electrode or the second electrode toward the electrophoretic element.

10. An electronic apparatus that includes the electrophoretic display device according to any one of claims 1 to 9.

11. The electrophoretic display device according to claim 1, wherein the first electrode and the second electrode are disposed in a same layer.

12. The electrophoretic display device according to claim 1, wherein the second electrode is substantially C-shaped in plan view.

13. A method of driving an electrophoretic display device in which an electrophoretic element is interposed between a pair of substrates, the electrophoretic display device including a first electrode and a second electrode that are formed in each pixel on one substrate; and an opposing electrode that is formed on another substrate and faces the first electrode and the second electrode through the electrophoretic element, the method comprising:
    inputting electric potential for displaying a first gradation to the pixel between the first electrode and the opposing electrode while inputting predetermined electric potential to the second electrode; and
    displaying, on the pixel, a gradation based on a difference in potential between the first electrode and the second electrode,
    wherein a first switching element that is connected to the first electrode, a second switching element that is connected to the second electrode, and an input terminal of the first switching element and an input terminal of the second switching element are connected by a common data line, and
    wherein the first electrode is at least partially surrounded by the second electrode in plan view.

14. The method of driving an electrophoretic display device according to claim 13, further comprising:
    controlling the size of a display area of the first gradation on the first electrode due to the difference in potential between the first electrode and the second electrode.

15. The method of driving an electrophoretic display device according to claim 13, further comprising:
    controlling a ratio of a display area of the first gradation within the pixel and a ratio of a display area of a second gradation different from the first gradation, by the difference in potential between the first electrode and the second electrode.

16. An electrophoretic display device in which an electrophoretic element is interposed between a pair of substrates, the electrophoretic display device comprising:
    a first electrode and a second electrode that are formed in each pixel on one substrate, the first electrode being at least partially surrounded by the second electrode in plan view;

an opposing electrode that is formed on another substrate, and faces the first electrode and the second electrode through the electrophoretic element;

a first switching element that is connected to the first electrode; and a second switching element that is connected to the second electrode; and wherein a plurality of the first electrodes is connected to each other, a control terminal of the first switching element and a control terminal of the second switching element are connected by a common scan line, and a gradation is displayed due to a difference in potential between the first electrode and the second electrode.

17. An electrophoretic display device in which an electrophoretic element is interposed between a pair of substrates, the electrophoretic display device comprising:

a first electrode and a second electrode that are formed in each pixel on one substrate, the first electrode includes an island-shaped portion that is arranged in a center portion of the pixel and a connection wiring portion that extends from the island-shaped portion, and the second electrode is formed along an outer edge of the island-shaped portion, the first electrode being at least partially surrounded by the second electrode in plan view; and an opposing electrode that is formed on another substrate, and faces the first electrode and the second electrode through the electrophoretic element, wherein a gradation is displayed due to a difference in potential between the first electrode and the second electrode.

* * * * *